United States Patent
Salami et al.

(10) Patent No.: US 9,743,328 B2
(45) Date of Patent: Aug. 22, 2017

(54) HANDOVER IN A CELLULAR COMMUNICATION NETWORK

(71) Applicant: Ubiquisys Limited, Swindon (GB)

(72) Inventors: Gbenga Salami, West Swindon (GB); Sandro Grech, Bath (GB)

(73) Assignee: Ubiquisys Limited, Swindon (GB)

( * ) Notice: Subject to any disclaimer, the term of this patent is extended or adjusted under 35 U.S.C. 154(b) by 561 days.

(21) Appl. No.: 14/014,870

(22) Filed: Aug. 30, 2013

(65) Prior Publication Data

US 2014/0066069 A1 Mar. 6, 2014

(30) Foreign Application Priority Data

Sep. 6, 2012 (GB) .................................. 1215955.4

(51) Int. Cl.
*H04W 36/30* (2009.01)
*H04W 36/00* (2009.01)

(52) U.S. Cl.
CPC ....... *H04W 36/30* (2013.01); *H04W 36/0083* (2013.01)

(58) Field of Classification Search
CPC .................................................. H04W 36/30
See application file for complete search history.

(56) References Cited

U.S. PATENT DOCUMENTS

| | | |
|---|---|---|
| 2002/0102977 A1 | 8/2002 | Shi |
| 2007/0217383 A1 | 9/2007 | Mitani |
| 2010/0041389 A1* | 2/2010 | Cave et al. .................... 455/423 |
| 2010/0173633 A1* | 7/2010 | Catovic et al. ............... 455/436 |
| 2011/0053587 A1* | 3/2011 | Turk ..................... H04W 24/08 455/423 |
| 2011/0194432 A1* | 8/2011 | Kato et al. .................... 370/252 |
| 2012/0276900 A1* | 11/2012 | Stephens et al. ............. 455/436 |
| 2015/0133119 A1* | 5/2015 | Huang et al. ................. 455/436 |

FOREIGN PATENT DOCUMENTS

| | | |
|---|---|---|
| EP | 1443787 A1 | 8/2004 |
| GB | 2338624 A | 12/1999 |
| GB | 2350026 A | 11/2000 |
| WO | WO2009/058069 A1 | 5/2009 |
| WO | WO2010/025022 A1 | 3/2010 |
| WO | WO2011/018616 A2 | 2/2011 |
| WO | WO2011/043705 A1 | 4/2011 |

OTHER PUBLICATIONS

GB Search Report dated Dec. 13, 2012 for GB Application No. 1215955.4.

* cited by examiner

*Primary Examiner* — Mazda Sabouri
(74) *Attorney, Agent, or Firm* — Weaver Austin Villeneuve & Sampson LLP (57) ABSTRACT

In a basestation of a cellular communications network, steps are taken to identify at least one situation, in which a user equipment device is liable to experience a rapid deterioration in a quality of a link with the base station. Measurement information is collected, related to the radio conditions experienced by a user equipment device in said situation, and at least one handover parameter is automatically adjusted in the basestation based on the collected information.

21 Claims, 4 Drawing Sheets

HANDOVER IN A CELLULAR COMMUNICATION NETWORK

FIELD OF THE INVENTION

This invention relates to handovers in a cellular communications network, and in particular to methods for controlling such handovers between base stations, and to base stations in which such methods are carried out.

BACKGROUND

In a cellular communications network, a user equipment device can establish a radio link with a base station that provides coverage to a particular cell. As the user equipment device moves through the network coverage area, from one cell to another, a handover is performed, so that the user equipment (UE) establishes a link with a second base station and breaks the link with the first base station.

Cellular communications network have well-established procedures for performing handovers, as defined in the relevant standards documents. These procedures depend on various parameters, which can be set by the network operator. Setting the handover parameters typically involves setting values for various radio link quality metrics, such that a handover is initiated when the parameter values are reached.

For example, a handover from a source cell to a target cell will typically rely on quality metrics of the radio link between the UE and the source cell and the radio link between the UE and one or more candidate target cells. The quality metrics are typically derived from measurements performed by the UE on downlink reference signals and reported back to the serving cell. The serving cell typically broadcasts the quality metrics that the UE is required to measure, and the thresholds that define the events that the UE is required to report back to the serving cell. For example, in the case of a $3^{rd}$ Generation Partnership Project (3GPP) Wideband Code Division Multiple Access (WCDMA) or High Speed Packet Access (HSPA) network the quality metrics might be the Common Pilot Channel (CPICH) Received Signal Code Power (RSCP). In the case of a 3GPP Long Term Evolution (LTE) network the quality metrics might be the CPICH chip power to noise ratio (Ec/No) and Reference Signal Receive Power (RSRP) and/ or Reference Signal Receive Quality (RSRQ). The serving cell then uses these UE measurements as inputs to vendor specific algorithms that control initiation and cancellation of handover procedures.

Thus, the first stage of a possible handover is that reporting of measurements for neighbouring cells is initiated if one or more quality metrics of one or more neighbouring cells exceeds either an absolute threshold (e.g. event 1E in WCDMA/HSPA or event A4 in LTE) or a threshold relative to the serving cell (e.g. event 1C in WCDMA/HSPA or event A3 in LTE).

Handover to a neighbouring cell is then typically triggered only if the quality metrics for the neighbouring cell are above a defined minimum absolute threshold and the quality metrics for the serving cell are below a defined minimum absolute threshold, or if the quality metrics for the neighbour cell are above the quality metrics of the serving cell.

However, it is known that a UE may encounter propagation environments where the quality of the link from the serving cell deteriorates rapidly and the quality of the link towards a neighbouring cell improves rapidly. This can mean that there is insufficient time for the UE to complete the handover preparation phase with the serving cell before the radio link to the serving cell is lost. Thus, in such an environment, the handover procedure is unreliable, leading to a high rate of handover failures.

This problem is well known, and can be mitigated through manual optimisation of the network which typically involves: detecting problem areas through monitoring handover key performance indicators (KPIs), performing drive tests or site scans in the identified problem areas, analysing handover traces associated with the failed handovers, and tuning the handover parameters and re-iterating the process until KPI targets are met. This is a time-consuming and expensive process for the network operator.

The handover parameters can be tuned such that handovers are initiated more readily, for example by setting short values for timer parameters and quality metrics thresholds that are readily met. However, setting such values for all target cells or throughout the network could cause additional unwanted signalling into the core network as the UE would respond to small changes in its RF environment.

SUMMARY

According to a first aspect of the present invention, there is provided a method of controlling handover in a cellular communications network, the method comprising, in a basestation of the cellular communications network:

identifying at least one situation, in which a user equipment device is liable to experience a rapid deterioration in a quality of a link with said base station;

collecting measurement information related to the radio conditions experienced by a user equipment device in said situation, and based on the collected information, automatically adjusting at least one handover parameter in said basestation.

According to other aspects of the invention, there are provided a basestation configured to operate in accordance with the method of the first aspect, and a computer program product containing code representing instructions for causing a basestation configured to operate in accordance with the method of the first aspect.

This has the advantage that, when a UE is in a position in which it is likely to experience a rapid degradation in signal quality, the basestation can react by adopting a more aggressive handover policy, so that the rapid degradation does not lead to a failed handover.

BRIEF DESCRIPTION OF THE DRAWINGS

For a better understanding of the present invention, and to show how it may be put into effect, reference will now be made, by way of example, to the accompanying drawings, in which.

DETAILED DESCRIPTION

Figure 1:
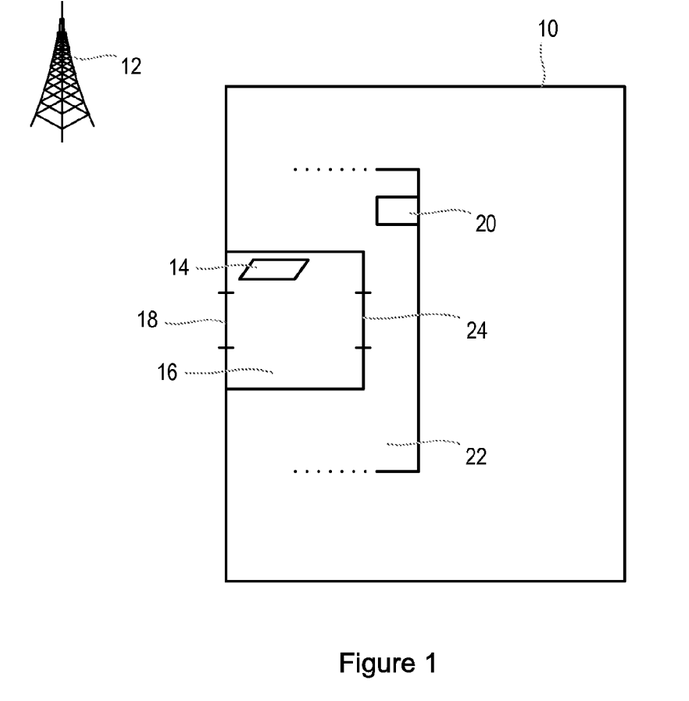
FIG. 1 illustrates a part of a cellular communications network.

FIG. 1 shows a part of a cellular communications network. A building 10 is located in the coverage area of a macrocell base station 12 of a cellular communications network, and FIG. 1 represents a part of a floor plan of the building 10. A small cell base station 14 is located in a lobby area 16 of the building 10, which is accessed through a door 18 from the outside of the building. A second small cell base station 20 is located in a corridor 22, which is accessed through a door 24 leading from the lobby area 16 of the building 10. Several other small cell base stations can be located in the building 10, as will be well understood.

Figure 2:
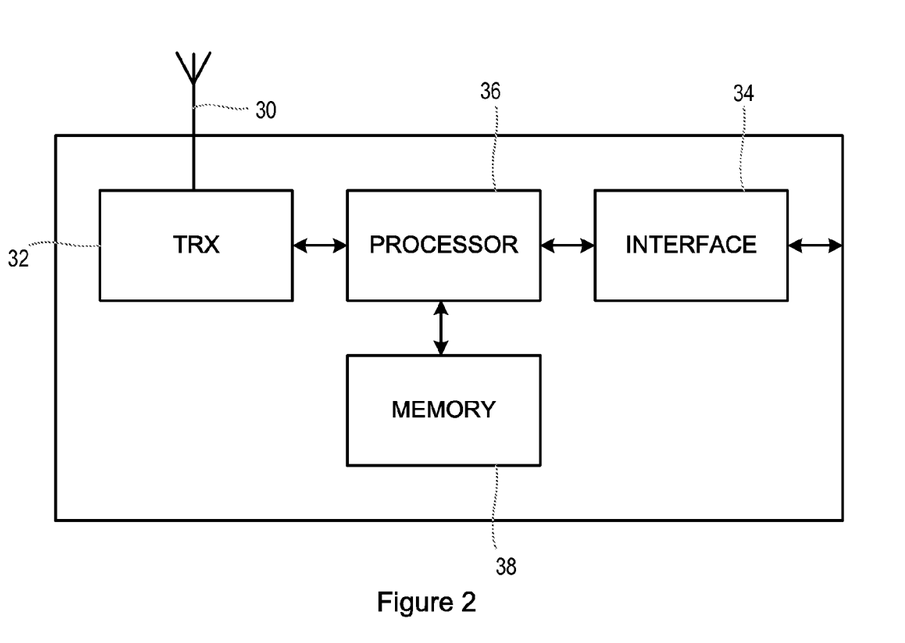
FIG. 2 illustrates a base station.

FIG. 2 shows the general form of one of the small cell base stations 14, 20. These are well known in themselves, and thus are described here only in so far as is required for an understanding of the present invention.

The small cell base station has an antenna 30, connected to radio transceiver (TRX) circuitry 32. The small cell base station also has an interface 34, for example for connection with a Local Area Network (LAN), for eventual connection over an IP network such as the internet to the core network of the cellular communications network. The base station operates under the control of a processor 36, in conjunction with a memory 38. The memory 38 stores instructions, in the form of software that has been installed or downloaded, for controlling the operation of the small cell base station, including as described further herein.

The method of the present invention can be implemented in any base station of a cellular communications network, but it is of particular applicability in a small cell base station, and especially in a base station that is deployed in an environment where a user is likely to experience rapid changes in quality metrics.

For example, in the case of a small cell base station such as the base station 14 shown in FIG. 1, a user who is active on that base station might experience a rapid deterioration in signal strength and/or signal quality as he moves outside the building through the door 18, or as he moves through the door 24 into the corridor 22, in particular if the doors provide a high degree of isolation for radio signals, for example if they are metal fire doors or the like. In a similar way, a user who is active on a base station might experience a rapid deterioration in signal strength from that base station as he moves around a corner of a building into an area that is in the radio shadow caused by that building.

Figure 3:
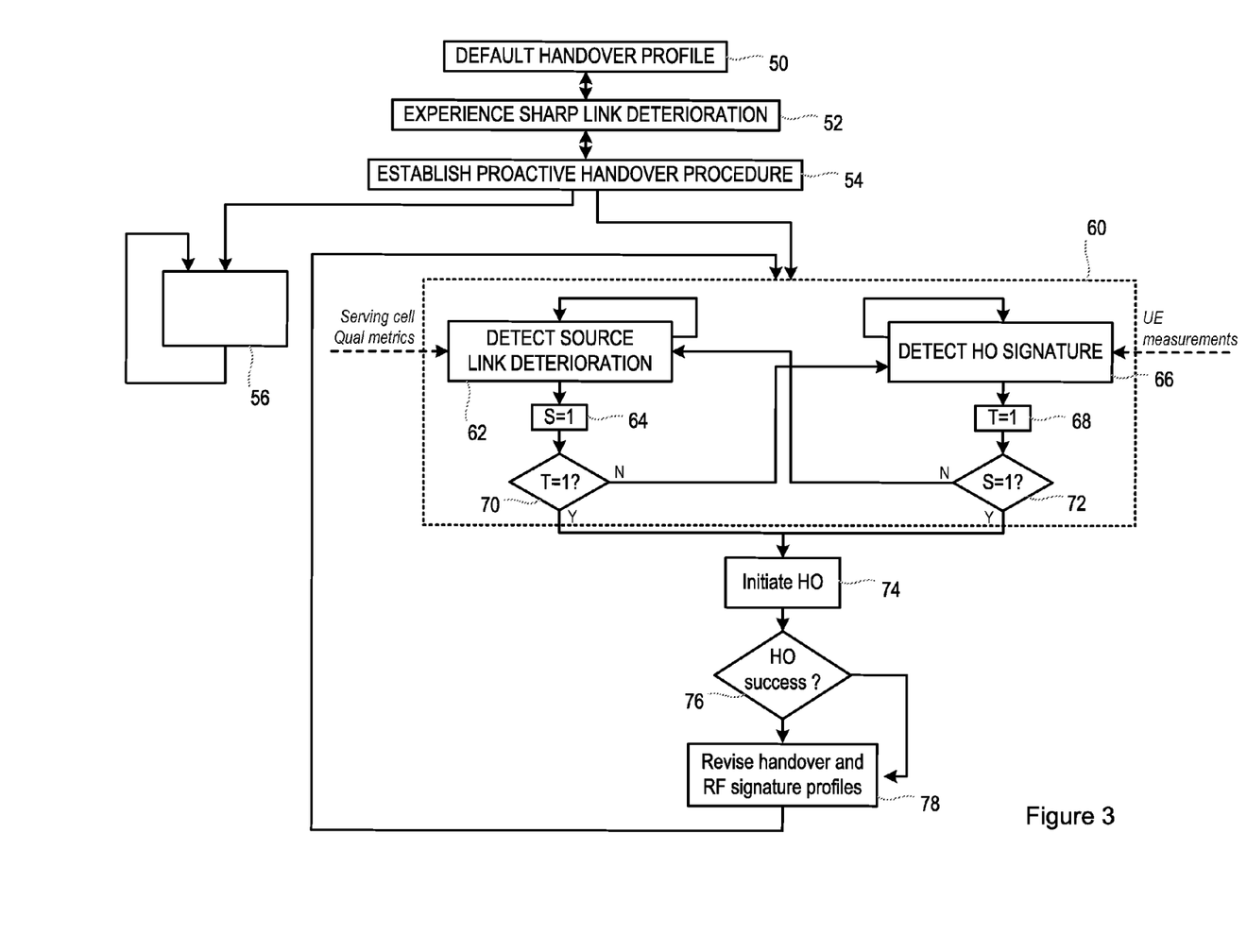
FIG. 3 illustrates a method of initiating a handover.

FIG. 3 is a flow chart, illustrating a method in accordance with the invention.

In step 50, the base station initialises the handover profile with default settings provisioned by the management system of the cellular communications network. As is conventional, the default handover profile includes parameters such as handover thresholds, handover hysteresis values, handover time-to-trigger values, and cell individual offsets.

In step 52, the base station operates conventionally, in that it provides coverage for any users within the cell, but it also takes steps to identify situations when a user equipment device experiences a sharp deterioration in the quality of its link with the base station.

Such a sharp deterioration can for example be detected while the user equipment device is in a call, or during an attempt to handover the user equipment device to another base station. Of course, a rapid deterioration in the link with the serving cell can mean that the handover attempt will fail, and the failure of a handover attempt can itself be taken as an indication that there has been a rapid deterioration of the source link.

Alternatively, a rapid deterioration can be identified by examining other parameters associated with the source link. For example, the rapid deterioration of the quality of the link associated with the serving cell can be detected by configuring two reporting event triggers representing two distinct absolute quality thresholds. The time elapsed between reception of UE reports associated with the two thresholds can then be measured. If that elapsed time is less than a predetermined time period, it can be determined that the link quality has deteriorated rapidly. For example, when the ratio of the energy per chip in the Common Pilot Channel to the total power (i.e. CPICH Ec/No) is used as the quality measure, a decrease of, say, 20 dB in less than, say, 2.5 seconds might be regarded as a rapid deterioration.

As an alternative, the rapid deterioration of the quality of the link associated with the serving cell can be determined from the detection of a long series of power control commands requesting an increase in downlink transmit power.

As a further alternative, the rapid deterioration of the quality of the link associated with the serving cell can be determined from the detection of a large change in the downlink power, for example expressed as the CPICH Ec/No or as the CPICH Received Signal Code Power (RSCP), in the time between the reception of a handover measurement report from the UE and the transmission of the radio link reconfiguration message to the UE by the serving cell.

As a further alternative, the quality of the link between the UE and the serving cell can be assessed by examining the power granted to the Dedicated Transport Channel (DCH) that is being used. Each time a radio link or DCH is established, power is allocated to the DCH relative to the CPICH. When the UE is near to the base station a low transmit code power can be used, compared to that used when the UE is far away, and the allocated power is adjusted to take account of the quality of the link. Thus, tracking the rate of change of the power granted to the DCH can give an indication of a rapidly deteriorating quality of the link associated with the serving cell. For example, a rapid deterioration can be determined when the maximum allowed down link DCH code power (or a percentage thereof) is allocated, or is allocated for a time exceeding a threshold period.

As a further alternative, the rapid deterioration of the quality of the link associated with the serving cell can be determined from the detection of a rapid degradation in the signal quality reported by the UE in its periodic measurement reports. As above, a decrease in the CPICH Ec/No of, say, 20 dB in less than, say, 2.5 seconds might be regarded as a rapid deterioration.

Thus, there are different situations in which a sharp deterioration of the quality of the link between a UE and the serving cell is detected. Any of these situations might indicate that the UE is in a "problem location", in which there is a danger of a failed handover procedure and/or a radio link failure. When such a sharp deterioration of the link quality is detected, the base station collects measurement information related to the radio conditions associated with the source, target and other cells experienced by UEs in that problem location. That is, when a rapid deterioration of the link quality is detected, the base station can instruct the UE to make a quality measurement, or a series of quality measurements, of the links with the basestation and with one or more other cells.

Further, if the base station experiences a sharp deterioration of the quality of the link with a user equipment device, the process passes to step 54, in which a proactive handover procedure 60 is established, using the measurement information relating to the problem location.

The step of establishing the proactive handover procedure 60 involves identifying at least one cell that is to be a target for a proactive handover. For example, if the need for a proactive handover has been identified because of the failure of a conventional handover towards a particular target cell (caused by the rapid deterioration of the link between the source cell and the user equipment device), that target cell might become the target cell for the proactive handover.

If the need for a proactive handover has been identified because of the sharp deterioration of the link with the serving cell at a time when no handover is under way, it is necessary to identify the target for the proactive handover procedure in another way. For example, if the sharp deterioration of the link with the serving cell is detected at a time when one or more target cells has already entered the reporting range (that is, for example, the signal strength or quality of such a cell has exceeded the level required to trigger the Reporting Event 1E) then, based on the UE reported measurements, the serving cell can select this target cell (or the most dominant of these cells if there is more than one) as the target cell for proactive handover.

In the event that no target cells have entered the reporting range, the source cell may request UE periodic measurements which will provide the source cell with information regarding all the cells that the UE can detect. The source cell can then rely on these measurements to identify a target cell for a proactive handover, and to determine appropriate settings required for the proactive handover.

As a further alternative, the source cell can select as the target cell for proactive handover the cell that it identifies as the most dominant cell, based on its own measurements performed during a radio environment scan. Small cells typically include a radio environment scan module, which controls the radio transceiver circuitry to detect signals on the downlink channels used by other cells. The information obtained from these scans can be used to identify a target cell for a proactive handover. In the event that the information obtained during the radio environment scan is not representative of the radio conditions experienced by a UE at a specific problem area, the source cell may need to tune its settings over a sequence of handover attempts, until the handover reliability is deemed to be optimal.

After the parameters of the proactive handover procedure have been established, the proactive handover procedure 60 can come into force, for one or more potential target cell. However, the conventional handover procedure 56 will remain in force for all other potential target cells, and the two procedures will operate in parallel.

Thus, in the conventional handover procedure 56, it is determined in a conventional way whether a handover should be performed for that user equipment device. Thus, it is determined whether the quality metrics associated with the link between the user equipment device and the base station indicate that a handover should be considered. In addition, the user equipment device can be instructed to report the results of measurements relating to the signals that it can detect from other neighbouring base stations, and these reported results can be used to determine whether the handover should be performed, based on conventional handover criteria, and based on the parameters specified in the default handover profile.

In the proactive handover procedure 60, firstly values for parameters S and T, to be described in detail below, are both set to 0.

Thus, in step 62, which is performed continuously, the base station (i.e. the serving cell for the user equipment device (UE) at that time) uses quality metrics associated with the link between the UE and the serving cell to detect a deterioration in link quality.

When the selected criteria indicate that there has been such a deterioration in link quality, the parameter S is set to 1, in step 64.

However, the relevant threshold is adjusted, such that a deterioration in link quality is detected at a quality value that would not trigger a conventional handover.

In step 66, which is performed continuously, and concurrently with step 62, the base station (i.e. the serving cell for the user equipment device (UE) at that time) uses measurement reports received from the UE to detect whether a radio frequency signature meeting specified criteria has been detected.

Thus, the UE detects signals transmitted by neighbouring base stations of the cellular communications network, and reports the results to the serving cell. The report therefore contains the list of neighbouring cells that could be detected, and the signal strength (or other quality metric) with which those cells could be detected. A radio frequency (RF) signature can then be formed from that list, either instantaneously or based on multiple reports. For example, a trend between successive reports can form part of the RF signature.

In step 66, it is determined whether the detected RF signature meets the specified criteria that indicate that a proactive handover should be performed, even though the default handover criteria are not met.

For example, one specified criterion might refer to the presence of a specified cell, or a specified set of cells, in the UE measurement report, or to the presence of that specified cell or set of cells at a specified quality.

As discussed in more detail below, the specified criteria that must be met by the RF signature can be adapted based on prior handover procedures. In that case, the initially specified criteria that must be met by the RF signature may be very broad (for example to the extent that any RF signature will be deemed to meet the criteria).

In one specific case, illustrated by way of example below, the specified criterion is the presence of a specific target cell above a set threshold (more specifically, the 1E reporting threshold for that target cell).

The specified criteria should ideally be set such that the RF signature can be used to deduce that the UE is in a "problem location", in which there is a danger of a rapid deterioration of link quality, and which therefore requires that proactive action should be taken. In some cases, this deduction can be made based on the presence of a specific target cell, perhaps at a specific signal quality. In other cases, the deduction can more safely be made when the UE detects the presence of a specific set of cells possibly with a specific set of measurement values. For example, the specified criteria might be met by a detected RF signature containing cells C1, . . . , Cn, with respective measurements M1, . . . , Mn, with +/−x dB tolerance in each case.

Preferably, the typical RF characteristics of the "problem locations" can be determined based on the history, for example of past handover attempts.

When it is determined that the detected RF signature meets the currently specified criteria, the parameter T is set to 1, in step 68.

When the parameter S is set to 1 in step 64, it is determined in step 70 whether the parameter T has already been set to 1. Similarly, when the parameter T is set to 1 in step 68, it is determined in step 72 whether the parameter S has already been set to 1.

As soon as it is determined that both S and T have been set to 1, the process passes to step 74, in which the source cell initiates a proactive handover procedure by sending a handover command towards one (or more) of the candidate cells identified through the UE measurements. This handover procedure then proceeds as a conventional handover.

When initiating a handover procedure, a specific target cell is identified. In this case, the target cell can be determined based on the detected RF signature. For example, it was mentioned above that the specified criteria might be met whenever a particular cell is detected, or whenever that particular cell is detected at a specified quality. In that case, that particular cell might be made the target cell for the handover, even if that particular cell is not the strongest detected cell.

After the handover procedure, it is determined in step 76 whether the handover was successful and, if it was unsuccessful, the cause of the failure is determined.

The process then passes to step 78 and, based on the outcome of the handover as determined in step 76, the source cell may revise the set of parameters that are used during a handover event, that is, the handover profile (for example by applying a Cell Individual Offset towards a specific cell or set of cells) and/or the RF signatures profile (that is, the criteria that are tested in step 66 to determine whether a proactive handover should be triggered.

The profiles can also be revised based on the success or failure of any handover that is attempted based on the conventional handover criteria.

For example, if a handover fails due to the loss of the radio link with the source cell before the handover preparation phase is completed, the source cell might (a) revise the cell individual offset for the target cell, thereby instigating earlier reporting of the target cell for future handovers, without influencing the reporting criteria of other neighbour cells, and (b) revise the sensitivity to the deterioration of the source cell. For example, when the deterioration of the quality of the link associated with the serving cell is determined by detecting when the link quality falls below a threshold, this quality threshold can be increased.

As another example, when a particular cell has been identified as a potential target for hand out, if one hand out to that cell fails because of a rapidly deteriorating radio link, the learning process could be used to attempt to prevent a recurrence of this. For example, the process could then be modified so that, having detected this particular cell as part of the RF signature, the parameters are modified to ensure an early hand out to that cell. Alternatively, a CPICH-RSCP-based hand out could be used, for example.

As discussed above, the link quality measurement that is used can, for example, be the CPICH Ec/No or the CPICH RSCP. It is possible to choose which of these to use based on the perceived radio conditions, for example, or to toggle dynamically between them.

Thus, the reliability of handovers can be improved in difficult propagation conditions by automatically detecting a rapid change in one or more quality metrics, and switching to a more proactive, or aggressive, handover strategy towards a selected neighbour as a function of this rapid change.

Any information derived by the base station as part of this process can be distributed to other base stations of the network, for example on a peer-to-peer basis for other small cells within a building of the like, or shared with a central server of the cellular communications network to facilitate learning across neighbouring nodes.

The method proceeds from the recognition that, even in the most difficult propagation conditions, the UE will almost always be within coverage of at least one suitable target cell by the time that the link to the source cell fails. Most handover failures can be attributed to the fact that the handover process is not triggered quickly enough to allow the completion of the handover preparation phase before the radio link to the source cell is completely lost.

Thus, in the method illustrated in FIG. 3, the detection of the degradation of the serving cell, and the fact that the RF signature meets certain criteria (such as the presence of one or more specific neighbour cells in the UE measurement reports) is used as a trigger for immediate initiation of the handover process, rather than waiting for the normal, more conservative, handover trigger conditions to be met.

As a result of this automatic, self-optimising feedback loop and learning process, the source cell will converge over time to an improved handover strategy. In this improved strategy, the UE is requested to be sufficiently proactive in reporting measurements associated with any specific cell that is a likely target for handover during rapid degradations of the source cell. For example, although a UE will typically report signal strength measurements that have been averaged over a period of one second, this could be modified so that measurements from such specific target cells are reported every 0.5 s or every 0.25 s. In some cases, the UE may be requested to report measurements from these target cells as soon as they can be detected.

Also, the handover decision from the source to the target cell is rendered more proactive when conditions associated with the problem areas collected from previous handovers are recognised. These conditions include rapid deterioration of the source link, and presence of a specific cell (or set of cells) in the UE measurement reports.

It will be noted that the optimization may include changing not only the handover threshold trigger points and hysteresis values, but also the associated handover timer (time-to-trigger) values.

Figure 4:
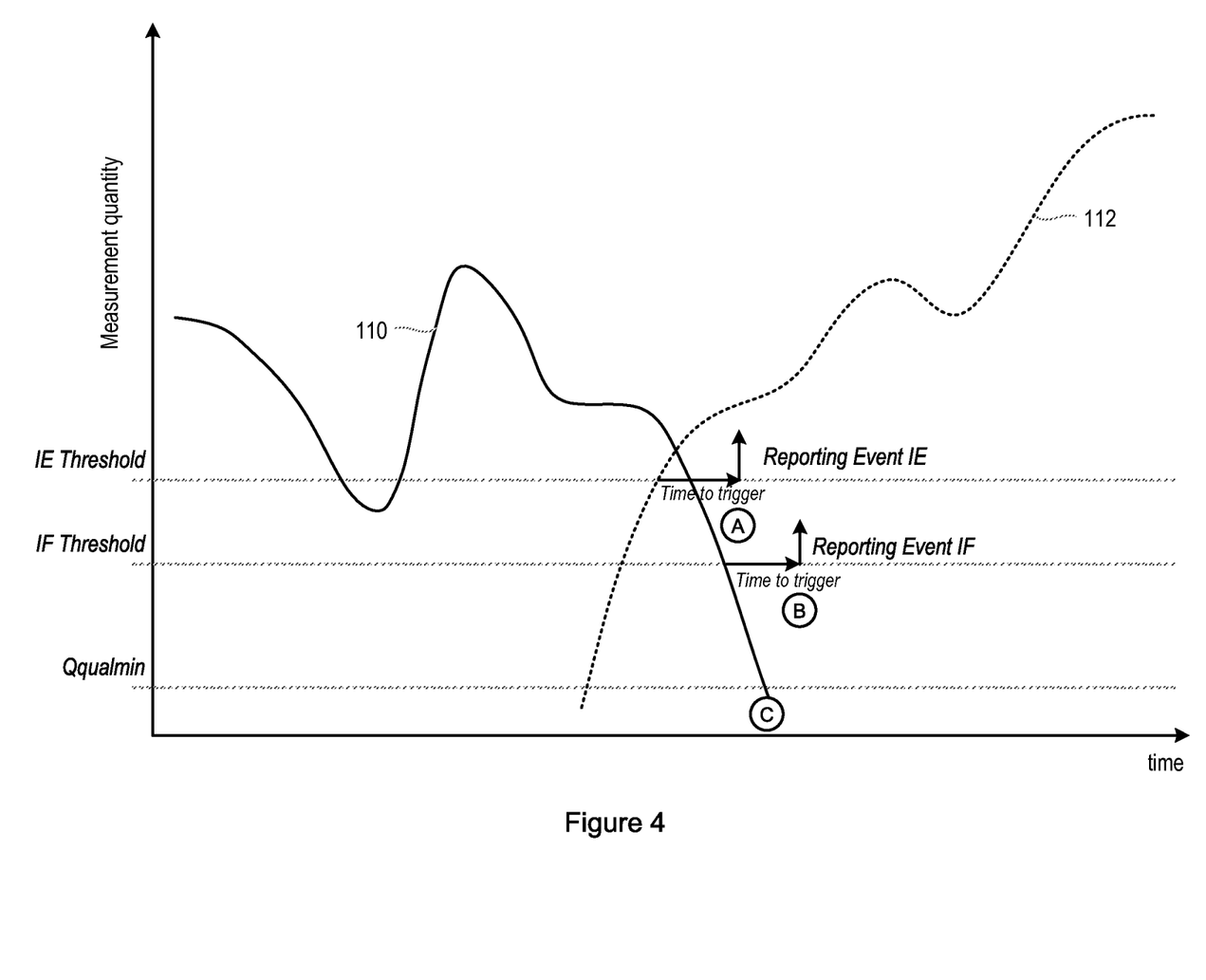
FIG. 4 illustrates a conventional method of performing a handover.
Figure 5:
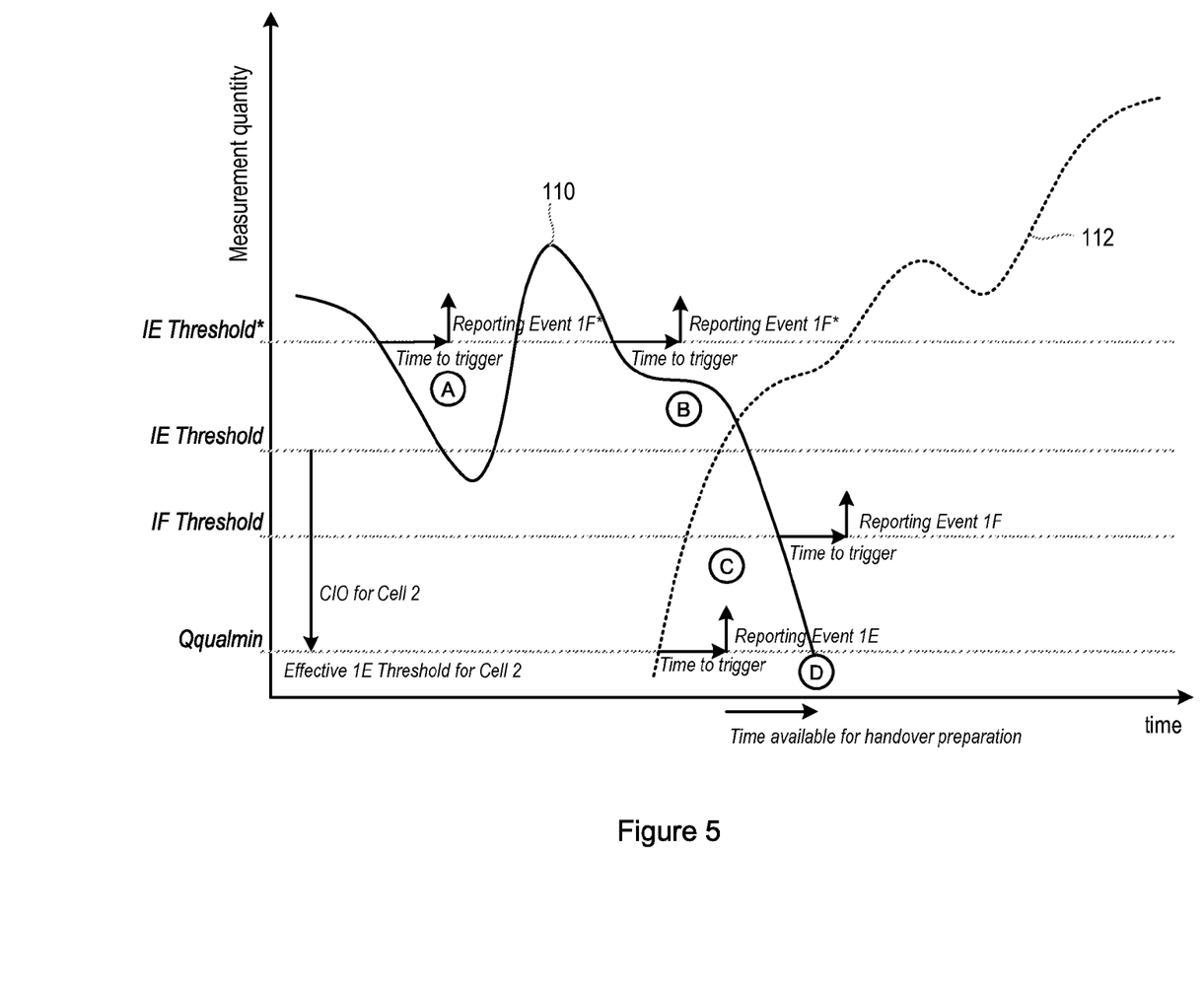
FIG. 5 illustrates the method shown in FIG. 3.

FIGS. 4 and 5 illustrate the improved handover reliability achieved by an embodiment of this invention. Specifically, FIG. 4 illustrates a conventional handover triggering sequence in the exemplary case of a Wideband Code Divisional Multiple Access (WCDMA) network, using the following standard definitions.

Qqualmin is the minimum link quality level (in terms of CPICH Ec/No) required to access a cell.

1E Threshold is the threshold used by UEs to trigger a 1E report. A 1E report is triggered when the measurement value of a primary pilot channel exceeds this absolute threshold for a "time to trigger" period.

IF Threshold is the threshold used by UEs to trigger a 1F report. A 1F report is triggered when the measurement value of a primary pilot channel is lower than this absolute threshold for a "time to trigger" period.

In FIG. 4, the line 110 represents the measurement quality in a first serving cell, while the line 112 represents the measurement quality in a second target cell. Thus, the UE sends a 1E Report at instant A, after the line 112 has been above the 1E Threshold for the "time to trigger", indicating that the target cell has reached a predetermined quality threshold. The UE then sends a 1F Report at instant B after the line 110 has been below the 1F Threshold for the "time to trigger", indicating that the serving cell has fallen below a predetermined quality threshold.

The serving cell should use this event sequence to trigger a handover from the serving cell to the target cell. Thus, FIG. 4 illustrates the conventional handover procedure, using the default parameter values, as used in step 56 of FIG. 3.

As can be seen in FIG. 4, however, in this particular example the quality of the serving cell is degrading so rapidly that, by the time that the handover preparation procedure is initiated at the instant B, the line 110 has fallen below Qqualmin, meaning that the UE is no longer accessible by the serving cell. This means that, after the handover preparation phase between the serving cell and the target cell is complete, the source cell is unable to send a physical channel reconfiguration command towards the UE, as is required to start the actual handover procedure.

In accordance with the present invention, following an initial handover failure between two cells, the cause of the handover failure is analysed. In the example illustrated in FIG. 4, the cause of the failure is the failure of the radio link between the serving cell and the UE before the serving cell sends the physical channel reconfiguration command during the handover procedure. This is characteristic of rapid link degradation, and so the source cell can initiate the proactive handover procedure towards the second cell by self-tuning the handover parameters applied for handovers.

Specifically, in the terms used in FIG. 3, a source link degradation is detected when the measurement quantity falls below a threshold level that is higher than the default threshold value, while an RF signature indicative of a handover is determined when the measurement quantity on the potential target cell becomes higher than a threshold level that is lower than the default value. FIG. 5 illustrates the result, where the first cell configures an additional 1F Threshold, indicated as 1F Threshold*, and applies a Cell Individual Offset (CIO) towards the second cell, as this was identified as a likely handover candidate during the prior unsuccessful handover attempt.

The additional 1F Threshold, 1F Threshold*, makes the first cell more sensitive to link quality degradations when it is acting as a serving cell, and the CIO for the second cell means that the first cell is alerted about the presence of the second cell at an earlier stage. Specifically, the CIO assigned to the second cell 2 effectively causes the UE to send a 1E Report as soon as the measurement quantity in the second cell exceeds Qqualmin for a "time to trigger" period. However, the CIO has no influence on the reporting of any other cells, and so the triggering threshold for all other cells remains the original 1E Threshold.

FIG. 5 illustrates the effect of these changes.

At instant A, the source cell receives a 1F Report, as the line 110 has fallen below the higher 1F* threshold. (In the terms of FIG. 3, the parameter S is set to 1.) At this point, however, the source cell does not take any action regarding a handover, as there are no identified handover candidates. (In the terms of FIG. 3, the parameter T remains equal to 0.)

At instant B, after the measurement quantity associated with the link between the UE and the serving cell has temporarily improved and then deteriorated again, the source cell receives a second 1F Report, as the line 110 has again fallen below the higher 1F* threshold. (In the terms of FIG. 3, the parameter S is again set to 1.) The source cell still does not take any action at this stage.

At instant C, the source cell receives a 1E Report associated with the second cell, indicating that the quality of this cell (as indicated by the line 112) has been above the effective 1E Threshold, namely Qqualmin, for the "time to trigger". Thus, the CIO applied to the second cell causes this report to be sent earlier than would otherwise have been the case.

Therefore, in this example, the serving cell uses the detection of the second cell as an RF signature representing the possibility of a fast handover triggering. (In the terms of FIG. 3, the parameter T is set to 1.)

Therefore, as it has also been detected that the source cell is of fairly low quality (S=1), the source cell initiates the handover preparation phase at instant C, as described in step 74 of FIG. 3. This leaves sufficient time (until the source cell measurement quality falls below Qqualmin at instant D in this example) for the handover preparation procedure to be properly completed and thus allows the handover to be successful.

Thus, while the proactive handover procedure is in force for the second cell as a potential target cell, triggering a handover following a determination that the source cell quality has fallen below the higher 1F* threshold (and that the second cell quality has reached a threshold), the conventional handover procedure remains in force for all other potential target cells, triggering a handover following a determination that the source cell quality has fallen below the default 1F threshold (and that the potential target cell quality has reached a threshold).

As before, the source cell may further tune its handover parameters based on the outcome of this second handover instance. For example, if this second handover still fails, the first cell might apply a still higher additional 1F Threshold* and/or a larger CIO offset towards the second cell, assuming that maximum/minimum allowed values have not already been reached.

Although the invention is described with reference to an example in which the handover procedures rely on quality measurements reach the 1E and 1F reporting thresholds, it will be appreciated that the invention is equally applicable to other handover procedures, for example based on 1C triggers for intra-frequency handovers or 2B triggers for inter-frequency handovers.

There is therefore disclosed a method of adapting handover parameters that saves significant costs associated with traditional handover optimisation techniques, in that it does not necessitate manual optimisation and drive tests, and avoids the need to resort to untargeted aggressive handovers that will lead to an increase in unnecessary handover activity. This therefore allows scalability of solutions where traditional handover optimisation techniques would not be commercially feasible (for example with enterprise femtocells, or high density outdoor small cells).

The invention claimed is:

1. A method of controlling handover in a cellular communications network, the method comprising, in a basestation of the cellular communications network:
    setting default criteria, such that a handover is performed when the default criteria are satisfied;
    identifying at least one situation, in which a user equipment device is liable to experience a rapid deterioration in a quality of a link with said base station, wherein identifying the at least one situation comprises receiving one or more measurement reports from one or more user equipment devices, wherein a measurement report from a user equipment device comprises measurement information related to radio conditions experienced by the user equipment device, wherein the measurement information indicates the presence of at least one specified cell detected by the user equipment device, wherein the presence of the at least one specified cell in the measurement report sent by the user equipment device indicates that the user equipment device is liable to experience a rapid deterioration in the quality of a link with said base station;
    when the received measurement reports indicate that the user equipment device is in said situation, automatically adjusting at least one handover parameter in said basestation such that a handover is performed even when the default criteria are not satisfied.

2. A method as claimed in claim 1, wherein the step of automatically adjusting at least one handover parameter in said basestation comprises making an adjustment to at least one handover parameter such that a user equipment device in said situation will be handed over to a target cell sooner than without said adjustment.

3. A method as claimed in claim 1, comprising increasing a threshold at which a user equipment device reports that a link with said basestation has fallen below a quality threshold.

4. A method as claimed in claim 1, comprising reducing a threshold at which a user equipment device reports that a link with said target cell has increased above a quality threshold.

5. A method as claimed in claim 1, wherein the step of automatically adjusting at least one handover parameter in said basestation comprises making an adjustment to at least one handover parameter such that:
 a handover of a user equipment device to a first target cell is initiated when a link quality between the user equipment device and the first target cell meets a quality criterion and when a link quality between the user equipment device and the base station falls below a first quality threshold; and
 a handover of a user equipment device to a second target cell is initiated when a link quality between the user equipment device and the second target cell meets a quality criterion and when a link quality between the user equipment device and the base station falls below a second quality threshold, wherein the second quality threshold corresponds to a higher link quality than the first link quality.

6. A method as claimed in claim 1, comprising identifying a situation, in which a user equipment device is liable to experience a rapid deterioration in a quality of a link with said base station, by a failure of a handover attempt.

7. A method as claimed in claim 1, comprising identifying a situation, in which a user equipment device is liable to experience a rapid deterioration in a quality of a link with said base station, by detecting if a quality of a link between the user equipment device and said base station falls from a first absolute quality threshold to a second absolute quality threshold in less than a predetermined time period.

8. A method as claimed in claim 1, comprising identifying a situation, in which a user equipment device is liable to experience a rapid deterioration in a quality of a link with said base station, by detecting a series of power control commands requesting an increase in downlink transmit power.

9. A method as claimed in claim 1, comprising identifying a situation, in which a user equipment device is liable to experience a rapid deterioration in a quality of a link with said base station, by detecting a large change in downlink power during a handover procedure.

10. A method as claimed in claim 1, comprising identifying a situation, in which a user equipment device is liable to experience a rapid deterioration in a quality of a link with said base station, by detecting high power granted to a downlink channel.

11. A method as claimed in claim 1, comprising identifying a situation, in which a user equipment device is liable to experience a rapid deterioration in a quality of a link with said base station, by detecting a rapid degradation in signal quality reported by the user equipment device in periodic measurement reports.

12. A method as claimed in claim 1, wherein the step of collecting measurement information related to the radio conditions experienced by a user equipment device in said situation comprises receiving a measurement report relating to signal quality on a link between a user equipment device and the base station.

13. A method as claimed in claim 12, wherein the step of collecting measurement information related to the radio conditions experienced by a user equipment device in said situation comprises receiving a series of measurement reports relating to signal quality on a link between a user equipment device and the base station.

14. A method as claimed in claim 2, wherein the step of collecting measurement information related to the radio conditions experienced by a user equipment device in said situation comprises receiving a measurement report relating to signal quality on a link between a user equipment device and at least one other base station.

15. A method as claimed in claim 14, wherein the step of collecting measurement information related to the radio conditions experienced by a user equipment device in said situation comprises receiving a series of measurement reports relating to signal quality on a link between a user equipment device and at least one other base station.

16. A computer program product, comprising a non-transitory computer readable medium storing machine readable instructions for controlling handover in a cellular communications network, the instructions comprising computer readable code suitable for instructing a basestation of the cellular communications network to perform the following method:
 setting default criteria, such that a handover is performed when the default criteria are satisfied;
 identifying at least one situation, in which a user equipment device is liable to experience a rapid deterioration in a quality of a link with said base station, wherein identifying the at least one situation comprises receiving one or more measurement reports from one or more user equipment devices, wherein a measurement report from a user equipment device comprises measurement information related to radio conditions experienced by the user equipment device, wherein the measurement information indicates the presence of at least one specified cell detected by the user equipment device, wherein the presence of the at least one specified cell in the measurement report sent by the user equipment device indicates that the user equipment device is liable to experience a rapid deterioration in the quality of a link with said base station;
 when the received measurement reports indicate that the user equipment device is in said situation, automatically adjusting at least one handover parameter in said basestation such that a handover is performed even when the default criteria are not satisfied.

17. A basestation for controlling handover in a cellular communications network, the basestation comprising:
 a processor; and
 memory storing instructions that, when executed, cause the basestation to perform the following steps:
  setting default criteria, such that a handover is performed when the default criteria are satisfied;
  identifying at least one situation, in which a user equipment device is liable to experience a rapid deterioration in a quality of a link with said base station, wherein identifying the at least one situation comprises receiving one or more measurement reports from one or more user equipment devices, wherein a measurement report from a user equipment device comprises measurement information related to radio conditions experienced by the user equipment device, wherein the measurement information indicates the presence of at least one specified cell detected by the user equipment device, wherein the presence of the at least one specified cell in the measurement report sent by the user equipment device indicates that the user equipment device is liable to experience a rapid deterioration in the quality of a link with said base station;

when the received measurement reports indicate that the user equipment device is in said situation, automatically adjusting at least one handover parameter in said basestation such that a handover is performed even when the default criteria are not satisfied.

18. A basestation as claimed in claim 17, wherein automatically adjusting at least one handover parameter in said basestation comprises making an adjustment to at least one handover parameter such that a user equipment device in said situation will be handed over to a target cell sooner than without said adjustment.

19. A basestation as claimed in claim 18, wherein the basestation is configured to increase a threshold at which a user equipment device reports that a link with said basestation has fallen below a quality threshold.

20. A computer program product as claimed in claim 16, wherein the instructions for automatically adjusting at least one handover parameter in said basestation comprise instructions for making an adjustment to at least one handover parameter such that a user equipment device in said situation will be handed over to a target cell sooner than without said adjustment.

21. A computer program product as claimed in claim 20, comprising instructions for increasing a threshold at which a user equipment device reports that a link with said basestation has fallen below a quality threshold.

* * * * *

UNITED STATES PATENT AND TRADEMARK OFFICE
CERTIFICATE OF CORRECTION

PATENT NO. : 9,743,328 B2  
APPLICATION NO. : 14/014870  
DATED : August 22, 2017  
INVENTOR(S) : Salami et al.

Page 1 of 1

It is certified that error appears in the above-identified patent and that said Letters Patent is hereby corrected as shown below:

In the Claims

Column 10, Line 62, in Claim 1, "station;" to read as -- station; and --.

Column 12, Line 44, in Claim 16, "station;" to read as -- station; and --.

Column 13, Line 5, in Claim 17, "station;" to read as -- station; and --.

Signed and Sealed this  
Nineteenth Day of June, 2018

Andrei Iancu  
*Director of the United States Patent and Trademark Office*